United States Patent
Moore et al.

(10) Patent No.: US 9,682,485 B2
(45) Date of Patent: Jun. 20, 2017

(54) LIFTER CUPS WITH AT LEAST ONE CHANNEL AND CONCENTRIC SLITS

(71) Applicant: Honda Motor Co., Ltd., Minato-ku, Tokyo (JP)

(72) Inventors: William Moore, Barrie (CA); John Earle, Alliston (CA)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 14/695,637

(22) Filed: Apr. 24, 2015

(65) Prior Publication Data
US 2015/0314457 A1 Nov. 5, 2015

Related U.S. Application Data

(60) Provisional application No. 61/986,596, filed on Apr. 30, 2014.

(51) Int. Cl.
*B25J 15/06* (2006.01)
*B25J 11/00* (2006.01)
(Continued)

(52) U.S. Cl.
CPC ........ *B25J 15/0683* (2013.01); *B21D 43/003* (2013.01); *B21D 45/02* (2013.01); *B25J 11/00* (2013.01); *B25J 15/06* (2013.01); *B25J 15/0608* (2013.01); *B21D 37/08* (2013.01); *B21D 43/05* (2013.01); *B21D 43/18* (2013.01); *F16B 47/00* (2013.01); *F16B 2001/0035* (2013.01); *Y10T 29/49828* (2015.01)

(58) Field of Classification Search
CPC ...... F16B 47/00; F16B 47/006; B65G 49/061; B25B 11/005; B25B 11/007
See application file for complete search history.

(56) References Cited

U.S. PATENT DOCUMENTS 1,400,573 A    12/1921  Stader
3,033,298 A *   5/1962  Johnson ............... B23Q 9/0014
                                                 125/20

(Continued)

FOREIGN PATENT DOCUMENTS

EP      1541255        6/2005
GB       741672       12/1955
KR    100852553 B1     8/2008

*Primary Examiner* — Gerald McClain
(74) *Attorney, Agent, or Firm* — Arent Fox LLP (57) ABSTRACT

Lifter cups are provided for engaging and lifting objects and include a mounting portion and a flexible engaging portion. The flexible engaging portion is configured to form a sealing disk for engaging the object. The sealing disk has channels diffusing fluid from the contact surface with the object. The channel walls have raised portions separated by concentric slits. For handling objects of magnetic material, a permanent magnet may be recessed into the flexible engaging portion. When the sealing disk engages with the surface of the object, the magnet exerts a magnetic force on the object sufficient to support holding the object for additional lateral support when lifting away from the center of gravity of the object. A transfer assembly and a method of configuring a lifter device for use in a stamping process for manufacturing a vehicle are also provided.

20 Claims, 7 Drawing Sheets

(51) Int. Cl.
    *B21D 43/00*         (2006.01)
    *B21D 45/02*         (2006.01)
    *F16B 47/00*         (2006.01)
    *B21D 37/08*         (2006.01)
    *B21D 43/05*         (2006.01)
    *B21D 43/18*         (2006.01)
    *F16B 1/00*         (2006.01)

(56) References Cited

U.S. PATENT DOCUMENTS

| | | | |
|---|---|---|---|
| 3,159,418 A * | 12/1964 | Hansen | B66C 1/0231 294/189 |
| 3,272,549 A * | 9/1966 | Nisula | B65H 3/0883 271/90 |
| 3,325,639 A | 6/1967 | King | |
| 3,517,835 A | 6/1970 | Temple | |
| 3,910,620 A | 10/1975 | Sperry | |
| 4,073,602 A | 2/1978 | Cagle | |
| 4,121,865 A * | 10/1978 | Littwin, Sr. | B66C 1/0218 294/186 |
| 4,471,844 A * | 9/1984 | Gallagher | E21B 21/015 173/32 |
| 4,978,269 A * | 12/1990 | Niederer | B65F 3/041 294/189 |
| 5,865,487 A | 2/1999 | Gore et al. | |
| 6,286,822 B1 * | 9/2001 | Blick | B24B 9/08 269/21 |
| 6,538,544 B1 | 3/2003 | Hardy | |
| 7,086,675 B2 * | 8/2006 | Jacobs | B65G 47/90 294/183 |
| 7,309,089 B2 | 12/2007 | Perlman et al. | |
| 7,712,807 B2 | 5/2010 | Perlman et al. | |
| 7,963,578 B2 * | 6/2011 | Wells | B66C 1/0212 294/2 |
| 2014/0161582 A1 * | 6/2014 | Maffeis | B25J 15/0683 414/800 |

* cited by examiner

LIFTER CUPS WITH AT LEAST ONE CHANNEL AND CONCENTRIC SLITS

CROSS-REFERENCE TO RELATED APPLICATIONS

This application claims the benefit of U.S. Provisional Application No. 61/986,596 filed Apr. 30, 2014, the entire disclosure of which is incorporated herein by reference.

BACKGROUND

The present disclosure relates generally to an apparatus and a process of using that apparatus in a manufacturing process, and more particularly, to a lifter cup used in a lifting assembly for lifting parts used in assembling a vehicle.

Lifting assemblies are utilized in many manufacturing processes, including automotive stamping machines, die presses, and the like, to lift, feed, and move objects made of a ferrous material from one operational area of an assembly line to another.

Current components used for lifting and moving objects include using rubber lifting cups and shaped lifters. However, these components are not capable of meeting the high volume and durability challenges of today's automotive stamping industry. For example, the shaped lifters are expensive to use because different shapes require differently shaped lifters. Rubber lifting cups are relatively inexpensive and most commonly used in lifting assemblies. However, a common problem with the known lifter cups designed for the automotive industry is the high failure rate due to wear of the cups. Particularly challenging for handling using lifter cups are objects with curved or irregularly-shaped surfaces that complicate lifting. Further, oil, dust, dirt, and other debris can interfere with stable operation using lifter cups. All of these challenges affect the flow of the production automation.

Accordingly, to solve one or more of these problems, it would be beneficial to provide, with minimal cost, a simple and efficient, but durable lifter cup capable of securely handling objects of varying shapes and sizes.

SUMMARY

The following presents a simplified summary in order to provide a basic understanding of some example aspects of the disclosed apparatus and methodology. This summary is not an extensive overview. Moreover, this summary is not intended to identify critical elements of the disclosure nor delineate the scope of the disclosure. The sole purpose of the summary is to present some concepts in simplified form as a prelude to the more detailed description that is presented later.

In accordance with one aspect, a cup is provided for engaging and lifting an object. The cup includes a mounting portion and a flexible engaging portion configured to form a sealing disk for engaging the object. The sealing disk has at least one channel encircling the central axis of the cup for diffusing fluid from the contact surface with the object. Each channel is formed between a pair of channel walls. Each channel wall has a pair of raised portions separated by a concentric slit. The flexible engaging portion of the cup is also adapted to receive a permanent magnet.

In accordance with another aspect, a cup is provided for engaging and lifting an object comprising of a magnetic material. The cup includes a mounting portion with a threaded insert permanently molded inside the mounting portion. The threaded insert is made of a magnetic material. The permanent magnet is retained in the flexible engaging portion through magnetic attraction to the threaded insert. When the sealing disk engages with the contact surface of the object, the permanent magnet exerts a magnetic force on the object sufficient to support holding the object for additional lateral support when lifting away from the center of gravity of the object.

In accordance with another aspect, a transfer assembly for use in a stamping process for manufacturing a vehicle is provided. The transfer assembly comprises a lifter device with cups coupled to an actuator, a transfer device, and controllers for controlling lateral positioning and vertical lifting and lowering of the handled object. Each cup comprises a mounting portion and a flexible engaging portion configured to form a sealing disk for engaging the object. The sealing disk has at least one channel encircling the central axis of the cup for diffusing fluid from the contact surface with the object. Each channel is formed between a pair of channel walls. Each channel wall has a pair of raised portions separated by a concentric slit. The flexible engaging portion is also adapted to receive a permanent magnet.

In accordance with another aspect, a method of configuring a lifter device for use in a stamping process for manufacturing a vehicle is provided. The method includes performing the step of providing a lifter device for lifting an object. The lifter device comprises a plurality of cups coupled to actuators, a transfer device, and controllers for controlling lateral positioning and vertical lifting and lowering of the handled object. Each cup comprises a mounting portion and a flexible engaging portion configured to form a sealing disk for engaging the object. The sealing disk has at least one channel encircling the central axis of the cup for diffusing fluid from the contact surface with the object. Each channel is formed between a pair of channel walls. Each channel wall has a pair of raised portions separated by a concentric slit. The flexible engaging portion is also adapted to receive a permanent magnet. The method further includes the step of positioning each of the plurality of cups below a top surface of a lower stamping die. The method also includes the step of coupling each of said plurality of cups to each of the plurality of actuators.

Other features and aspects may be apparent from the following detailed description, the drawings, and the claims.

BRIEF DESCRIPTION OF THE DRAWINGS

The foregoing and other aspects of the present disclosure will become apparent to those skilled in the art to which the present disclosure relates upon reading the following description with reference to the accompanying drawings, in which.

DETAILED DESCRIPTION

Example embodiments that incorporate one or more aspects of the apparatus and methodology are described and illustrated in the drawings. These illustrated examples are not intended to be a limitation on the present disclosure. For example, one or more aspects of the disclosed embodiments can be utilized in other embodiments and even other types of devices. Moreover, certain terminology is used herein for convenience only and is not to be taken as a limitation. Still further, in the drawings, the same reference numerals are employed for designating the same elements.

Figure 1:
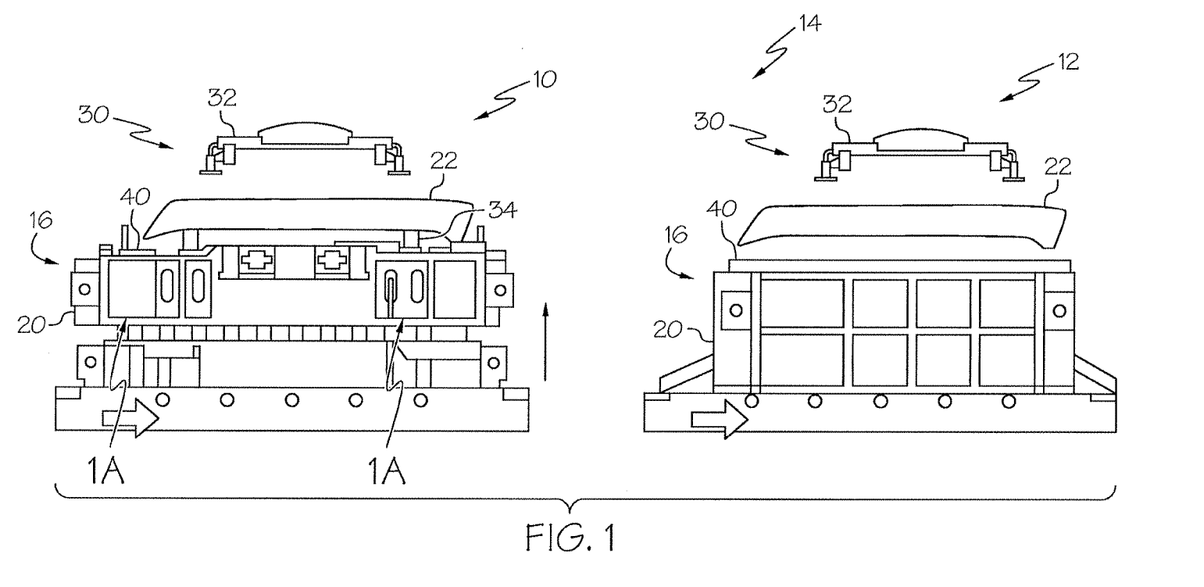
FIG. 1 illustrates an exemplary first stage and second stage of a stamping process.

FIG. 1 illustrates an exemplary first stage 10 and second stage 12 of a stamping process 14. Although illustrated as including two stages, stamping process 14 may include any number of stages needed to produce a desired product. In the exemplary embodiment, stamping process 14 is configured for use in manufacturing a vehicle. First stage 10 includes a first stamping die 16, which includes an upper die (not shown in FIG. 1) and a lower die 20. Stamping dies are one-of-a-kind precision tools that cut and/or form a sheet of material, such as a portion of a metal sheet (also known as a blank and referred to herein as a workpiece 22) into a desired shape or profile as workpiece 22 is pressed or stamped between the upper and the lower die 20. Intermediate forms of workpiece 22 typically move through a series of stamping dies to produce a final product.

Most steps of the stamping process 14 utilize some type of a transfer assembly 30 or multiple transfer assemblies to lift and move workpiece 22 to first stage 10, from first stage 10 to second stage 12, and/or from second stage 12 to another step in the assembly process. An example of transfer assembly 30 includes at least one lifter device 34, a transfer device 32, and controllers (not shown in FIG. 1) for controlling lateral positioning and vertical lifting and lowering of workpiece 22. For example, lifter device 34 presses upward from below workpiece 22 to raise workpiece 22 into a predefined position. Transfer device 32 is lowered toward workpiece 22 from above workpiece 22. Transfer device 32 is then removably coupled to workpiece 22, after which transfer device 32 transfers workpiece 22 from first stage 10 to second stage 12. Transfer device 32 may include, but is not limited to, a source of vacuum pressure, nitrogen cylinders with removable suction cup holders that secure workpiece 22, and a mechanism to move workpiece 22 to the next sequential position. Depending on the size of workpiece 22, more than one suction cup holder may be used to attach to different portions of workpiece 22.

In the illustrated embodiment, workpiece 22 is positioned in first stage 10, and more specifically, is positioned between the upper die (not shown in FIG. 1) and lower die 20 of first stamping die 16. The upper portion of the stamping die 16 is lowered toward workpiece 22 and workpiece 22 is stamped between the upper die and lower die 20 to form a first preform. The upper die of the first stamping die 16 moves away in the upward direction from workpiece 22, and is placed on hold until a subsequent workpiece is placed inside the first stamping die 16. Next, workpiece 22 is lifted into a pick-up position by lifter device 34. In the exemplary embodiment, lifter device 34 includes a plurality of lifter cups 36 (shown in FIG. 2) each coupled to an actuator 38 (shown in FIG. 4), for example, a pneumatic cylinder. Although described as a pneumatic cylinder, actuator 38 may include a nitrogen cylinder and/or any other type of device that allows lifter device 34 to function as described herein.

Figure 1A:
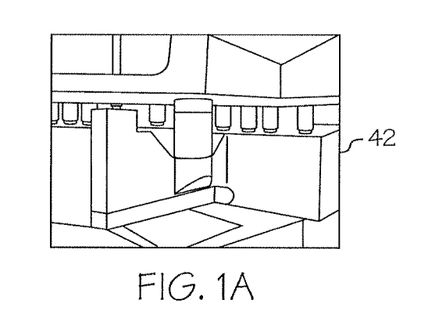
FIG. 1A is a partial side view of a lower die that may be included in the stamping process shown in FIG. 1.

In a first, recessed position, the lifter cups 36 are positioned below a top surface 40 of lower die 20. In a second, extended position, the actuators 38 are activated which extends the lifter cups 36 to a position above top surface 40 of lower die 20. In an alternative embodiment shown in FIG. 1A, the lifter cups 36 may be coupled by, for example, a block 42, and at least one actuator 38 may be coupled to block 42. In the exemplary embodiment, block 42 is manufactured from a plastic, for example, but not limited to, urethane. When the actuator 38 is activated, the actuator moves the block 42, which extends the lifter cups 36 to a position above top surface 40 of lower die 20.

Once workpiece 22 is in a pick-up ready position, transfer device 32 is lowered vertically towards workpiece 22 until the suction cup holders contact the surface of workpiece 22. When the suction cup holders touch the surface of workpiece 22, the vacuum source applies vacuum pressure to the contact surface between the suction cup holders and workpiece 22. After vacuum pressure is applied to the contact surface of workpiece 22, the suction cup holders securely engage with workpiece 22 in a way that permits transporting workpiece 22 to the second stage 12. Once workpiece 22 is moved to the second stage 12, another blank is placed into the first stage 10 and the stamping process is repeated.

Note that any number of different stamping stages (each with a die) could be provided in series each supported by respective transfer assemblies, as desired for any given manufacturing process. The process could utilize a single transfer assembly for moving each blank or preform amongst the different stamping steps, or alternatively a different transfer assembly could be associated with a respective stamping step to expedite the movement of objects between the sequential stamping stages.

Figure 2:
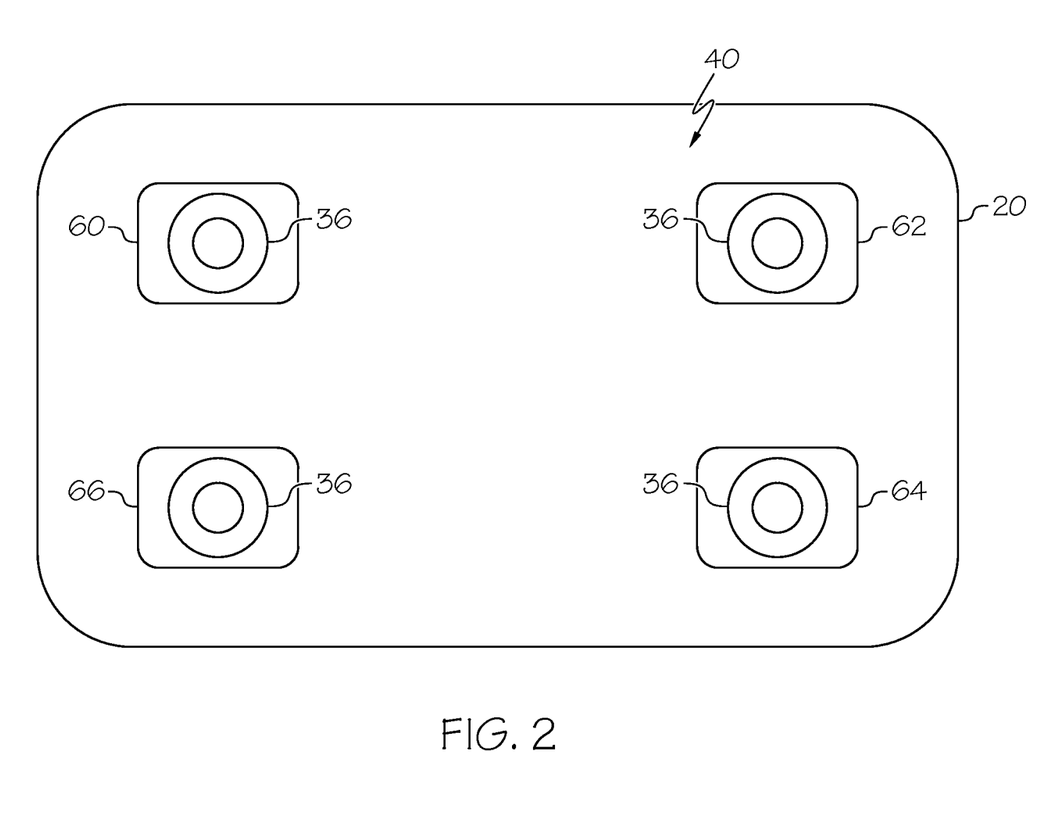
FIG. 2 is a top view of a lower die that may be included in the stamping process shown in FIG. 1.

FIG. 2 is a top view of lower die 20 (shown in FIG. 1). In the exemplary embodiment, lower die 20 includes at least one opening, for example, a first opening 60, a second opening 62, a third opening 64, and a fourth opening 66, defined therein. Openings 60, 62, 64, and 66 allow a lifter device, for example, lifter device 34 (shown in FIG. 1) to extend from below top surface 40 of lower component 20 to above top surface 40 of lower component 20. More specifically, actuator 38 (shown in FIG. 4) is configured to move lifter cups 36 between a position below top surface 40 and a position above top surface 40. Although illustrated as including four openings and four lifter devices, lower component 20 may include any number of openings and associated lifter devices that allow transfer assembly 30 to function as described herein.

Figure 3:
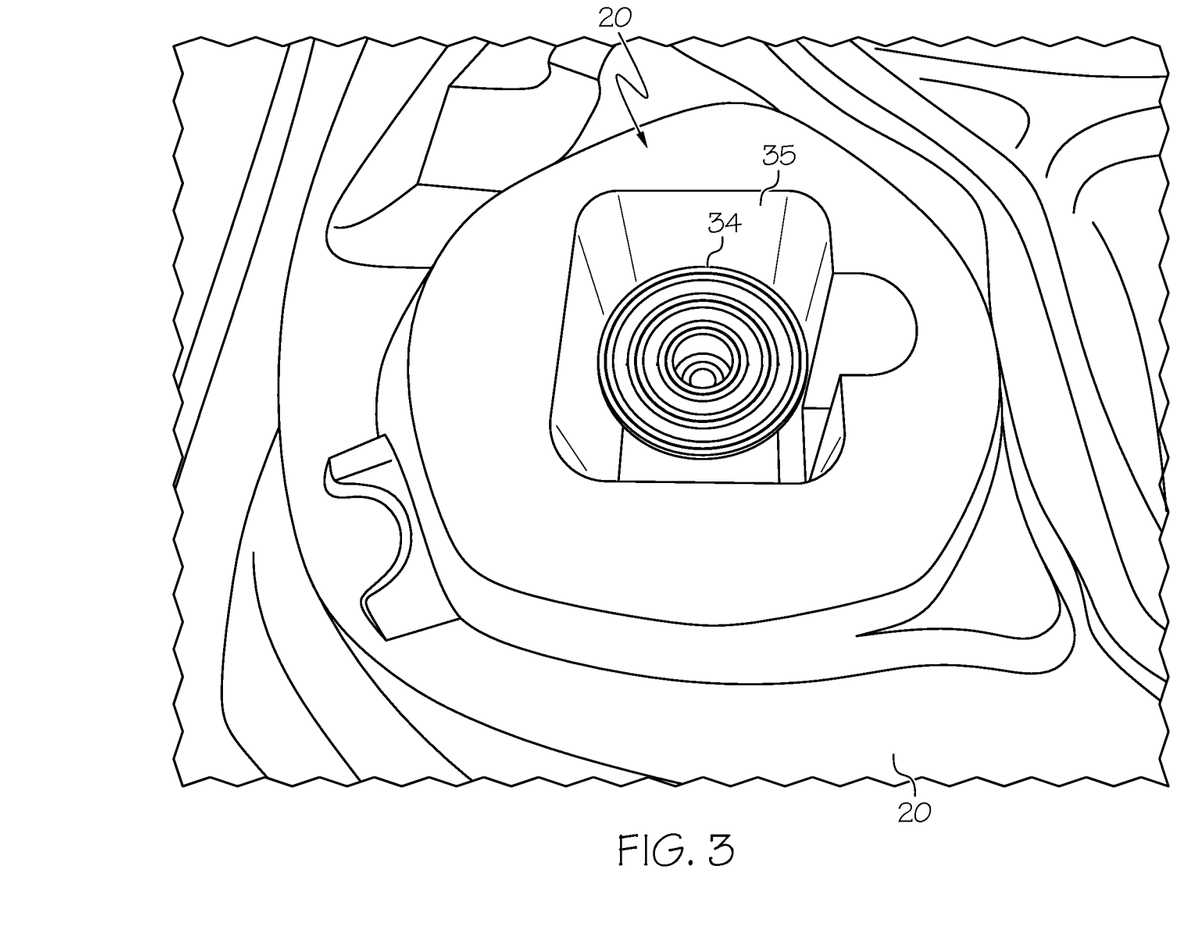
FIG. 3 is a partial perspective view of the lower die shown in FIG. 2 and a lifter device.

FIG. 3 is a partial perspective view of an exemplary lower die 20 and lifter device 34. A depression 35 is formed inside the lower die 20. The depression 35 surrounds each of the openings shown in FIG. 2 (i.e., first opening 60, a second opening 62, a third opening 64, and a fourth opening 66).

Figure 4:
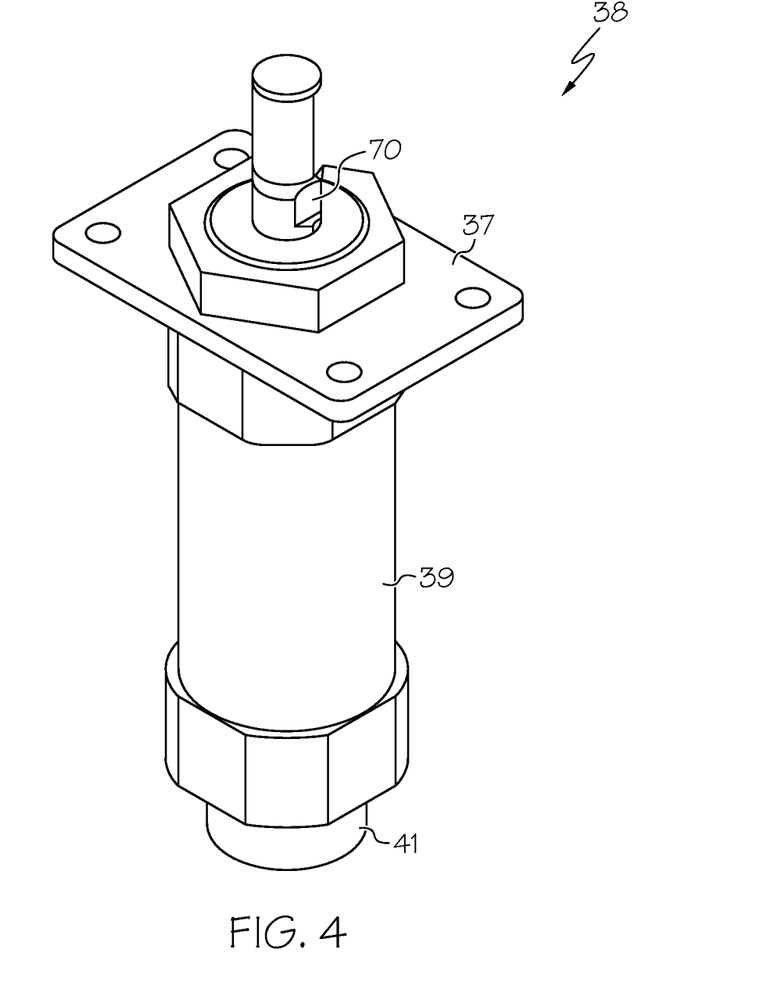
FIG. 4 is a perspective view of an actuator that may be included in the lifter device shown in FIG. 3.

FIG. 4 is a perspective view of an example of actuator 38 that may be included in lifter device 34 (shown in FIG. 1). In the exemplary embodiment, actuator 38 is a nitrogen cylinder that includes a mounting plate 37 allowing the actuator 38 to attach to the lower die 20, a piston 39 which encloses the nitrogen cylinder, a mounting portion 41 configured to attach the actuator 38 to the air supply (not shown in FIG. 4), and a threaded portion 70 which attaches to (e.g., screws into) the threaded insert portion (not shown in FIG. 4) of the lifter cup 36. More detail about the threaded insert portion of lifter cup 36 will be provided with reference to FIG. 6.

Figure 5:
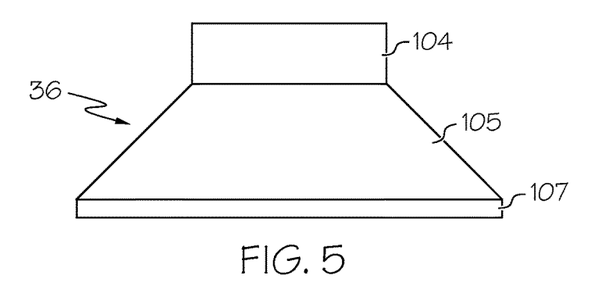
FIG. 5 is a side view of a lifter cup that may be included in the lifter device shown in FIG. 3.
Figure 6:
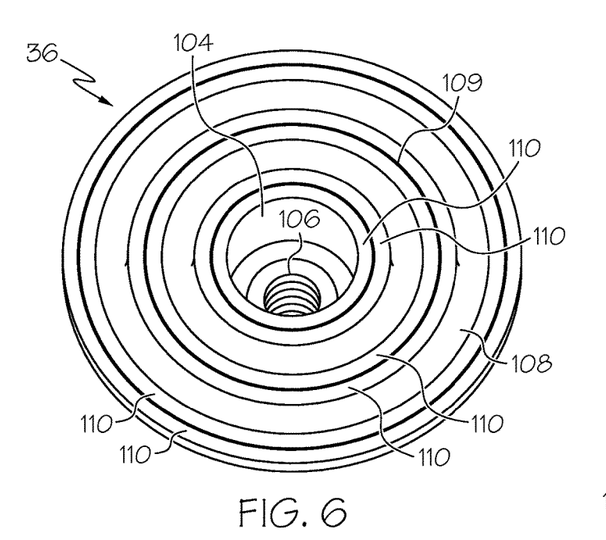
FIG. 6 is a perspective view of the lifter cup shown in FIG. 5.

Referring now to FIG. 5 and FIG. 6, a first example embodiment of lifter cup 36 is illustrated. As shown in FIG. 5, the lifter cup 36 has a mounting portion 104 and a flexible engaging portion 105. The flexible engaging portion 105 of the lifter cup 36 is configured to form a sealing disk 107 for engaging the object to be handled, for example, workpiece 22 (shown in FIG. 1). During the handling process, the lifter cup 36 is moved towards workpiece 22 until the sealing disk 107 contacts and presses onto the surface of workpiece 22. In the exemplary embodiment, the flexible engaging portion 105 is adapted to receive a permanent magnet. More detail about the permanent magnet will be provided with reference to FIG. 8 below.

As further shown in FIG. 6, the mounting portion 104 has a threaded insert 106. The threaded insert 106 may be permanently molded inside the mounting portion 104. The threaded insert 106 can connect to the matching threaded portion 70 of actuator 38 (shown in FIG. 4). For this example, the mounting portion 104 and the flexible engaging portion 105 of the lifter cup 36 are integrally molded, although in alternative embodiments, the pieces could be separately formed and joined using an adhesive or otherwise connecting them together.

In one embodiment, the lifter cup 36 is made of a flexible urethane of shore 80 A, a material that has high resistance to permanent indentation (i.e., hardness). The physical properties of urethane surpass those of other flexible rubber materials, making urethane a more resilient and durable material for lifter cups. As a result, urethane lifter cups offer superior performance, excellent abrasion resistance, and lifetime durability, making them highly cost effective. For example, urethane lifter cup prototypes used for over 500,000 lifts have shown virtually no wear. Lifter cups made of urethane are particularly strong when lifting objects with a flat surface.

In another embodiment, the lifter cup 36 is made of a flexible but resilient elastomeric material, such as nitrile, natural rubber, or the like.

Figure 7:
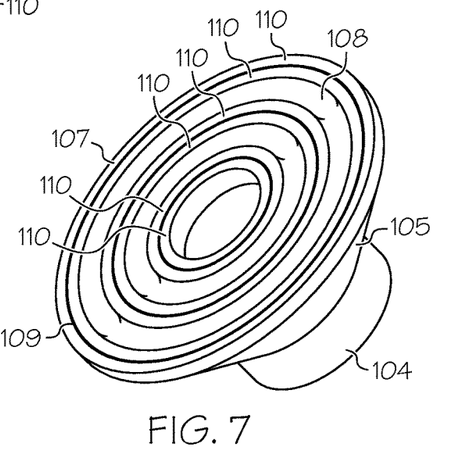
FIG. 7 is a perspective view of the lifter cup shown in FIG. 5.

FIG. 6 and FIG. 7 show perspective views of the sealing disk 107 of lifter cup 36 according to the first embodiment. The sealing disk 107 has multiple channels 108 encircling the central axis of the lifter cup 36. The channels 108 can diffuse fluids, oil, dust, dirt, or other debris formed on the surface of workpiece 22 before or during stamping process 14. Each channel 108 is formed between a pair of channel walls forming a pair of raised portions 110. Each of the raised portions 110 is separated by a concentric slit 109. The raised portions 110 allow the flexible engaging portion 105 of the lifter cup 36 to form multiple sealing areas when engaging the object to be handled, for example, workpiece 22 (shown in FIG. 1). The concentric slits 109 provide lateral flexibility during handling of the workpiece 22.

The combination of the urethane material, the channels 108, and the concentric slits 109 ensures lateral flexibility coupled with vertical rigidity of the lifter cup 36. The above-described lifter cup 36 can have a variety of applications in assembly lines. The lifter cup 36 is particularly suited for lifting of unexposed automotive panels during automotive stamping processes.

According to one embodiment, the channels 108 are U-shaped.

According to another embodiment, the concentric slits 109 on the sealing disk 107 of the lifter cup 36 are about 1 mm deep, which can be provided at typical manufacturing tolerances.

According to one example design, the lifter cup 36 has a diameter of about 70 mm, which can be provided at typical manufacturing tolerances.

According to another example design, the lifter cup 36 has a diameter of about 50 mm, which can be provided at typical manufacturing tolerances. The smaller diameter ensures that the lifter cup 36 will be a more rigid, stiffer lifter cup. Such lifter cups are very durable and particularly suited for lifting heavy objects, such as inner automotive door panels.

Figure 8:
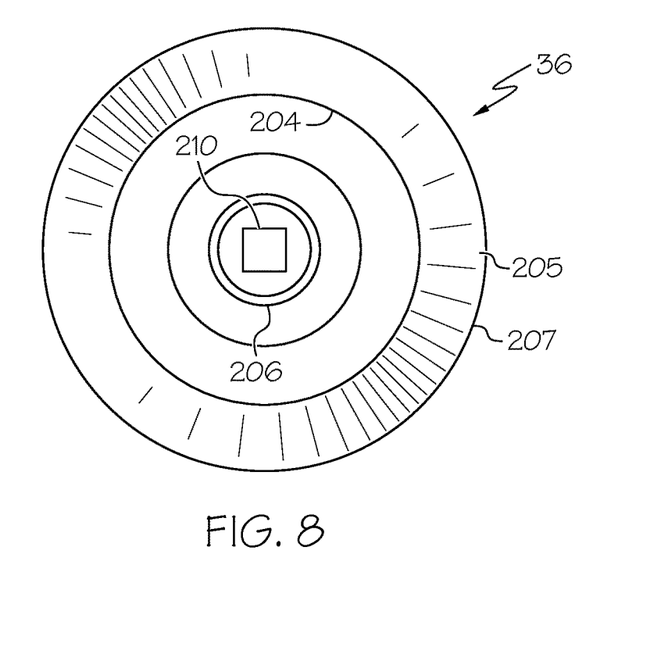
FIG. 8 is an alternative embodiment of the lifter cup shown in FIG. 5.

Referring now to FIG. 8, in a second example embodiment of the lifter cup 36, the flexible engaging portion 105 is adapted to receive a permanent magnet 210. For this embodiment, a threaded insert 206 of the lifter cup 36 is made of a strong magnetic material, such as steel, although other strong, magnetic alloys could also be used. A permanent magnet 210 can be recessed and retained into the flexible engaging portion 205 of the lifter cup 36 through magnetic attraction to the threaded insert 206.

As previously shown in FIG. 6, the threaded insert 106 (as numbered in the first embodiment) has an internal thread that can be modified to fit any type of actuator, allowing the lifter cup 36 to attach to the actuator 38 depicted in FIG. 4.

In the embodiment depicted in FIG. 8, the threaded insert 206 is permanently molded inside the mounting portion 204 of the lifter cup 36. The magnet 210 is recessed into the flexible engaging portion 205 of the lifter cup 36 through magnetic attraction to the threaded insert 206. The magnet 210 has a contact surface positioned towards the outside of the cup's sealing disk 207. The magnet 210 is sufficiently close to the contact surface of workpiece 22. As used in this embodiment, when the sealing disk 207 engages with the contact surface of workpiece 22, the permanent magnet 210 exerts a magnetic force on workpiece 22 sufficient to engage and support holding workpiece 22 in contact with the lifter cup 36. The permanent magnet 210 provides lateral support, if required, and prevents workpiece 22 from being moving in a lateral direction when being lifted in a vertical direction by lifter device 32. In combination with the channels 108 and the concentric slits 109, the magnet 210 increases the overall reliability and effectiveness of the lifter cup 36.

In another embodiment, the magnet 210 can be a 14 lb. rare-earth magnet. Rare-earth magnets are strong permanent magnets made from alloys of rare earth elements. Rare-earth magnets produce significantly stronger magnetic fields than other types such as ferrite or alnico magnets. For example, the magnetic field typically produced by rare-earth magnets can be in excess of 1.4 teslas, whereas ferrite or ceramic magnets typically exhibit fields of 0.5 to 1 tesla.

According to another embodiment, the magnet 210 can be a 14 lb. rare-earth magnet recessed about 4 mm deep inside the flexible engaging portion 105 of the lifter cup 36, which can be provided at typical manufacturing tolerances. This configuration ensures that the magnet 210 is sufficiently close to the threaded insert 206 to be retained inside the flexible engaging portion 105 of the lifter cup 36 through magnetic attraction to the threaded insert 206.

In another embodiment, the threaded insert 206 can be permanently molded inside the mounting portion 204 of the lifter cup 36.

In another embodiment, the magnet 210 can be removed when no additional lateral support is needed. For example, if the handled object is balanced, the use of the magnet 210 is optional and the magnet 210 is typically used only when the handled object is off-balance.

Figure 9:
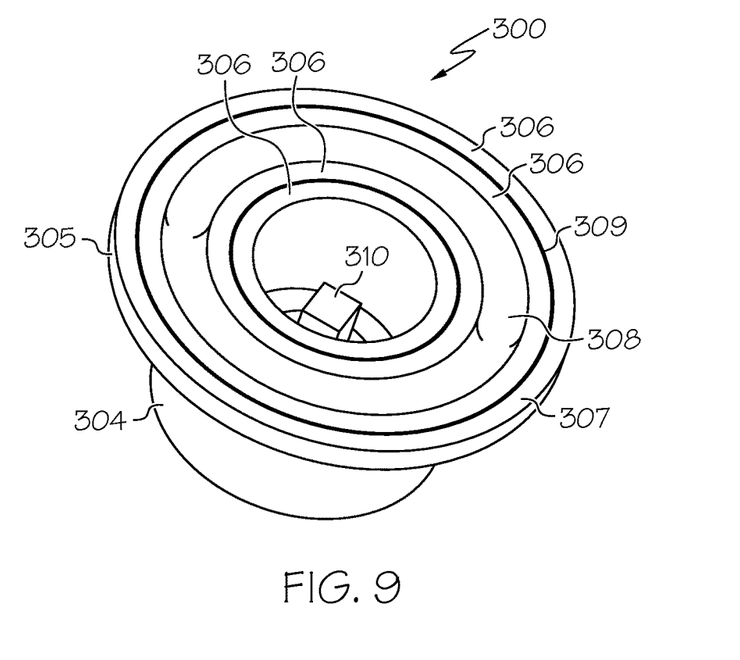
FIG. 9 is another alternative embodiment of the lifter cup shown in FIG. 5.

FIG. 9 depicts another embodiment 300 of the lifter cup 36 in which the sealing disk 307 has only one channel 308 and only channel walls comprising two concentric raised portions 306 surrounding the channel 308. As further illustrated in FIG. 9, the lifter cup 300 according to this embodiment has the same design as the lifter cup 36 according to the first embodiment with a mounting portion 304, a flexible engaging portion 305, sealing disk 307, channels 308, raised portions 306, concentric slits 309, and an optional permanent magnet 310.

Figure 10:
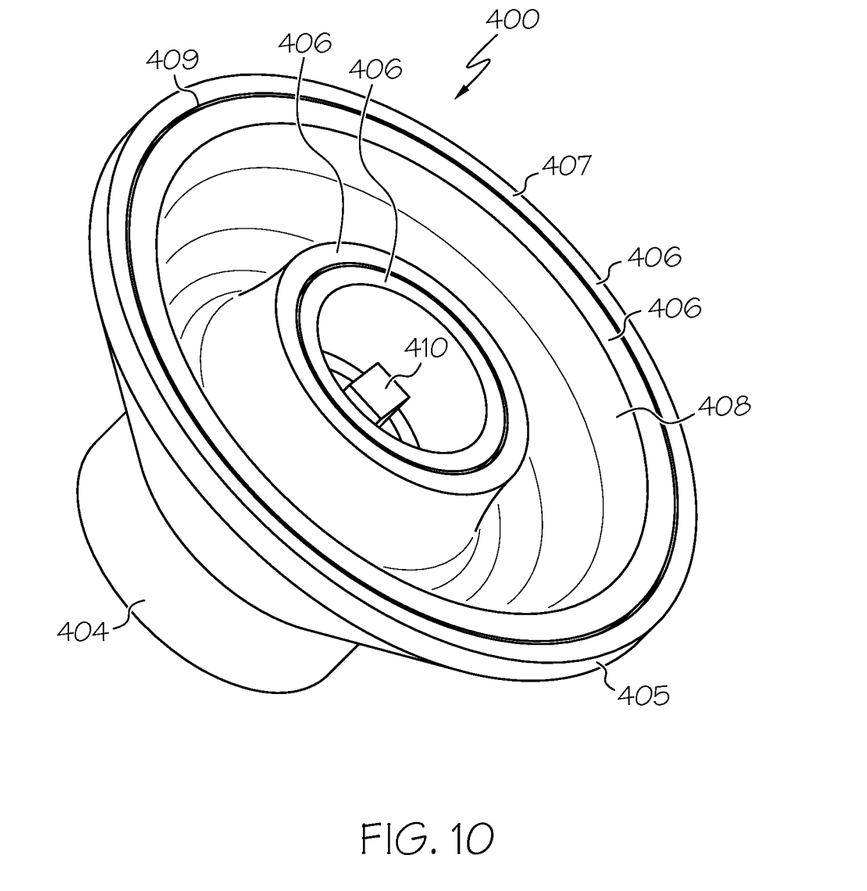
FIG. 10 is another alternative embodiment of the lifter cup shown in FIG. 5.

Referring now to FIG. 10, in another embodiment 400 of the lifter cup 36, the cup 400 can have channels 408 that are deeper than 12 mm. This embodiment is referred to herein as a "Deep Dish" cup which is specifically designed for exposed automotive panel lifting. As depicted in FIG. 10, the lifter cup 400 according to this embodiment has similar design as the lifter cup 36 according to the first embodiment with a mounting portion 404, a flexible engaging portion 405, sealing disk 407, channels 408, raised portions 406, concentric slits 409, and an optional permanent magnet 410 which can be used in this configuration in the same way described above with respect to the lifter cup 36 according to the first embodiment. The difference between the two embodiments is that the channels 408 in embodiment 400 of the lifter cup 36 are deeper than 12 mm.

According to one example design, the "Deep Dish" lifter cup 400 has a diameter of about 70 mm, which can be provided at typical manufacturing tolerances.

According to another example design, the "Deep Dish" lifter cup 400 has a diameter of about 50 mm, which can be provided at typical manufacturing tolerances. The smaller diameter ensures that the lifter cup 400 will be a more rigid, stiffer lifter cup. Such lifter cups are very durable and particularly suited for lifting heavy objects, such as outer automotive door panels.

Each of the cup embodiments described above have various advantages for use in particular lifting operations based on the features of the object being lifted. Further flexibility can be provided by combining different features of the various embodiments into a single cup, or by using different cups in situations or at locations suited for that particular cup. For example, for lifting an object having different contours and perhaps different compositions at different locations, one type of cup might be used for one location, but another type of cup used at another location on the same lifting assembly, to provide better handling of that object. This might lead to use of both a "Deep Dish" lifter cup and another lifter cup on the same apparatus.

Many other example embodiments can be provided through various combinations of the above described features. Although the embodiments described hereinabove use specific examples and alternatives, it will be understood by those skilled in the art that various additional alternatives may be used and equivalents may be substituted for elements and/or steps described herein, without necessarily deviating from the intended scope of the application. Modifications may be necessary to adapt the embodiments to a particular situation or to particular needs without departing from the intended scope of the application. It is intended that the application not be limited to the particular example implementations and example embodiments described herein, but that the claims be given their broadest reasonable interpretation to cover all novel and non-obvious embodiments, literal or equivalent, disclosed or not, covered thereby.

What is claimed is:

1. A cup for engaging and lifting an object, said cup comprising:
   a mounting portion; and
   a flexible engaging portion configured to form a sealing disk for engaging the object, wherein
   said sealing disk has at least one channel that completely and contiguously encircles a central axis of the cup, said at least one channel being configured to diffuse a fluid from a contact surface with the object, said at least one channel being formed between a pair of channel walls, each of said pair of channel walls comprising a pair of raised portions separated by a concentric slit; and
   a depth of the at least one channel is greater than a depth of the concentric slit.

2. The cup of claim 1, wherein the sealing disk further comprises a second channel encircling the central axis of the cup, said second channel being configured to diffuse the fluid from the contact surface with the object, said second channel being formed between one of said pair of channel walls and another channel wall comprising another pair of raised portions separated by another concentric slit.

3. The cup of claim 1, wherein the at least one channel is U-shaped.

4. The cup of claim 1, wherein the mounting portion comprises a threaded insert.

5. The cup of claim 4, wherein the threaded insert is made of a magnetic material.

6. The cup of claim 1, wherein the flexible engaging portion is adapted to receive a permanent magnet.

7. The cup of claim 6, wherein the permanent magnet is retained in the flexible engaging portion through magnetic attraction to the threaded insert.

8. The cup of claim 6, wherein when the sealing disk engages with the contact surface of the object, the permanent magnet exerts a magnetic force on the object sufficient to support holding the object for additional lateral support when lifting away from a center of gravity of said object.

9. The cup of claim 6, wherein the permanent magnet is a rare-earth magnet.

10. The cup of claim 6, wherein the permanent magnet is recessed about 4 mm deep inside the flexible engaging portion.

11. The cup of claim 1, wherein the flexible engaging portion is integrally molded with the mounting portion.

12. The cup of claim 1, wherein the at least one channel is deeper than 12 mm.

13. The cup of claim 1, wherein the cup is made of flexible urethane of shore 80 A.

14. The cup of claim 1, wherein the concentric slits are each about 1 mm deep.

15. The cup of claim 1, wherein the cup is made of flexible urethane from shore 60 A to shore 70 A.

16. The cup of claim 1, wherein at least one of the at least one channel is arranged at least 20 mm away from another one of the at least one channel for lateral stability during handling of the object.

17. A transfer assembly for use in a stamping process for manufacturing a vehicle, said transfer assembly comprising:
   at least one lifter device with a plurality of cups for engaging and lifting an object, each of said plurality of cups being coupled to an actuator;
   a transfer device; and
   a plurality of controllers for controlling lateral positioning and vertical lifting and lowering of the object, wherein each of the plurality of cups comprises a mounting portion and a flexible engaging portion configured to form a sealing disk for engaging the object, wherein said sealing disk has at least one channel that completely and contiguously encircles a central axis of the cup, said at least one channel being configured to diffuse a fluid from a contact surface with the object, said at least one channel being formed between a pair of channel walls, each of said pair of channel walls comprising a pair of raised portions separated by a concentric slit; and a depth of the at least one channel is greater than a depth of the concentric slit.

18. The transfer assembly of claim 17, wherein the flexible engaging portion of each of the plurality of cups is adapted to receive a permanent magnet.

19. A method of configuring a lifter device for use in a stamping process for manufacturing a vehicle, said method comprising the steps of:

providing a lifter device for lifting an object, said lifter device comprising:
a plurality of cups, and
a plurality of actuators, wherein
each of the plurality of cups comprises a mounting portion and a flexible engaging portion configured to form a sealing disk for engaging the object, wherein said sealing disk has at least one channel that completely and contiguously encircles a central axis of the cup, said at least one channel being configured to diffuse a fluid from a contact surface with the object, said at least one channel being formed between a pair of channel walls, each of said pair of channel walls comprising a pair of raised portions separated by a concentric slit and a depth of the at least one channel is greater than a depth of the concentric slit;

positioning each of the plurality of cups below a top surface of a lower stamping die; and coupling each of said plurality of cups to each of the plurality of actuators.

20. The method of claim 19, further comprising the step of activating each of the plurality of actuators to extend each of the plurality of cups to a position above a top surface of the lower stamping die moving the object in a pick-up ready position.

\* \* \* \* \*